United States Patent [19]

Barberon et al.

[11] 3,735,373

[45] May 22, 1973

[54] MAGNETIC MEMORY

[75] Inventors: Michel Barberon, Paris; Eliane Fruchard, nee Triquet; Robert Fruchart, both of l'Hay-les-Roses; Gerard Louis Lorthioir, Vitry-sur-Seine; Roland Madar, Rabat, all of France

[73] Assignee: Agence Nationale De Valorisation De La Recherche, Paris, France

[22] Filed: July 21, 1971

[21] Appl. No.: 164,520

[30] Foreign Application Priority Data

July 24, 1970 France ................................7027403

[52] U.S. Cl.....340/174 NA, 340/174 YC, 252/62.51, 23/191

[51] Int. Cl. ...............................................G11c 11/02

[58] Field of Search.................340/174 YC, 174 NA; 252/62.51; 23/191

[56] References Cited

UNITED STATES PATENTS

| | | | |
|---|---|---|---|
| 3,582,877 | 6/1971 | Benoit | 340/174 YC |
| 3,611,420 | 10/1971 | Benoit | 346/74 MT |

OTHER PUBLICATIONS

Advances in Inorganic Chemistry & Radiochemistry, "Nitrides of Metal of the First Transition Series," Juza, Vol. 9, 1966, p. 81–131.

*Primary Examiner*—Stanley M. Urynowicz, Jr.
*Attorney*—Larson, Taylor & Hinds

[57] ABSTRACT

An information support for a magnetic store provides storage locations made of a storage material of the formula $Mn_3$ Rh $N_x$ in which $x$ has a value from 0.5 to 0.95 and is preferably in the region of 0.8. The storage material may be deposited as a thin layer or at discrete locations on a substrate such as glass or may be uniformly dispersed as fine particles within a matrix of plastics material forming a thin sheet. The storage material assumes a ferromagnetic state on being heated from a first temperature to a second temperature and then being cooled in a magnetic field to a temperature above a critical temperature. Recording of information is carried out by locally heating the information support material, for example by a laser beam, sufficiently for the ferromagnetic state to appear at the recording location on subsequent cooling in a magnetic field. Read-out is achieved by detecting the magnetization at the recording location directly or indirectly, and erasure can be obtained by cooling to below a critical temperature at which the magnetic state disappears.

12 Claims, 6 Drawing Figures

MAGNETIC MEMORY

This invention relates to a magnetic memory or store and to an information support for such a store which provides data storage locations made of a storage material capable of storing data in magnetic form.

An information support according to the invention is characterized in that the storage locations are made of a storage material of the formula $Mn_3$ Rh $N_x$, in which $x$ has a value from 0.5 to 0.95.

According to one advantageous embodiment of the information support, the compound $Mn_3$ Rh $N_x$ forms a thin layer deposited on a substrate.

According to another advantageous embodiment of the store, the compound $Mn_3$ Rh $N_x$ is uniformly dispersed in the form of fine particles within a matrix of plastics material forming a thin sheet which may be flexible.

According to another advantageous embodiment of the said store, the compound $Mn_3$ Rh $N_x$ occupies a group of discrete locations distributed over a surface.

A magnetic store according to the invention includes an information support, data storage locations on the information support and made of a storage material capable of storing data in magnetic form, write-in means for recording data in magnetic form on the information support at the data storage locations, and read-out means for detecting data stored on the information support at the data storage locations and providing a read-out signal significant of the stored data. The store is characterized in that the storage locations on the information support are made of a storage material of the formula $Mn_3$ Rh $N_x$, in which $x$ has a value from 0.5 to 0.95, and the write-in means comprises means for locally heating a storage location from a first temperature to a second temperature and means providing a magnetic field in which the storage location assumes a magnetic state on subsequent cooling from the second temperature.

Figure 1:
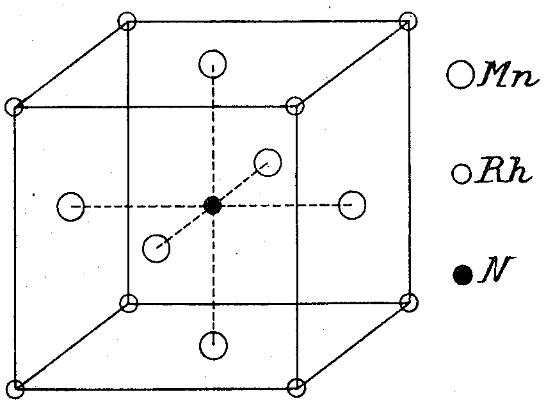
Figure 2:
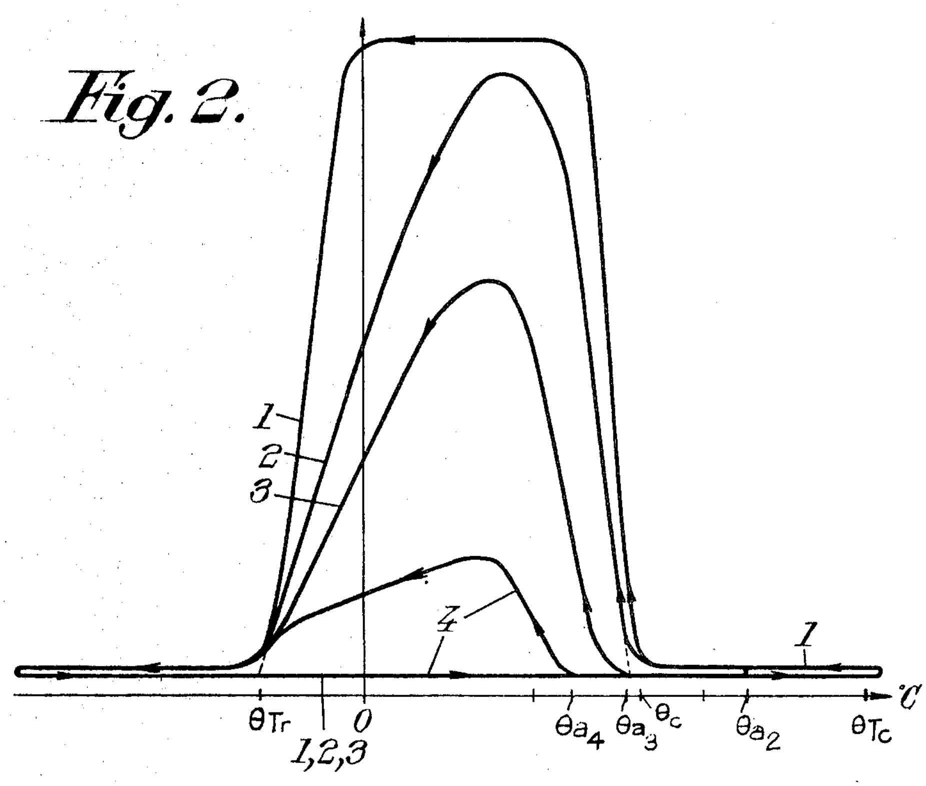
Figure 3:
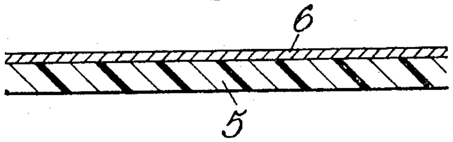
Figure 4:
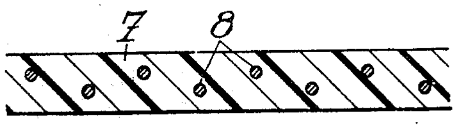
Figure 5:
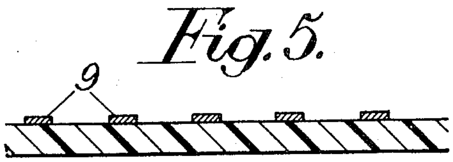
Figure 6:
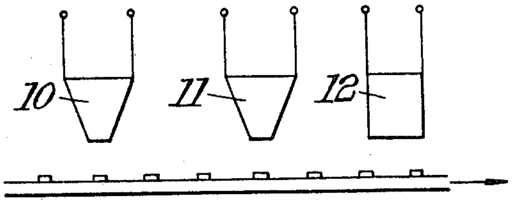

The invention will be more readily understood from the following detailed description, given by way of example, and from the drawing, in which FIG. 1 illustrates the lattice of the compound $Mn_3$ Rh $N_x$; FIG. 2 shows a group of curves illustrating the magnetic properties of the compound $Mn_3$ Rh $N_x$ for a given value of x; FIGS. 3, 4 and 5 show in diagrammatic highly enlarged cross-section several embodiments of information supports according to the invention; and FIG. 6 is a schematic representation of an embodiment of a magnetic store according to the invention.

An information support for a magnetic store embodying the invention may be prepared as described hereinafter.

It has been found that compounds of the formula $Mn_3$ Rh $N_x$, having a structure which is that of metallic perovskites having a cubic lattice and in which the manganese atoms (see FIG. 1) occupy the positions ½, ½, 0, the rhodium atoms occupy the positions 0, 0, 0 and the nitrogen atom occupies the position ½, ½, ½ (the inequality $x<1$ indicates nitrogen vacancies), have very advantageous magnetic properties when 0.5 $x$ 240.95.

It has been found that, if such a compound is brought to a high enough temperature greater than a given temperature $\theta_{Tc}$, then on cooling below the Curie point $\theta_c$, it acquires a ferromagnetic state which is stable in time and which it retains down to a temperature $\theta_{Tr}$ which is considerably below 0°C and below which it is non-magnetic. Magnetization of the compound (with a constant magnetic field) remaining substantially constant over a wide temperature range. This range includes ambient temperature for at least some values of $x$. When the compound is subjected to the temperature rise from a temperature below $\theta_{Tr}$, it remains non-magnetic as long as it does not undergo cooling; this phenomenon is illustrated by the curve 1 in FIG. 2 which shows the variation in the field magnetization against the temperature expressed in degrees Centigrade.

It has also been found that, if the compound is heated to a high temperature $\theta_a$ which is less than $\theta_{Tc}$ and which may be less than the Curie point, it acquires on cooling a ferromagnetic state whose magnetization in a given magnetic field depends considerably on the temperature $\theta_a$, such magnetization at a given temperature, e.g., 20°C, increasing with increasing $\theta_a$. This phenomenon is illustrated by the curves 2, 3 and 4 in FIG. 2, which correspond respectively to the temperature $\theta_{a2}$, $\theta_{a3}$ and $\theta_{a4}$. It will be seen from these curves that the magnetization of thecompound passes through a maximum situated in a relatively narrow temperature range, and is zero at the temperature $\theta_{Tr}$.

The above parameters vary with the nitrogen content of the compound, i.e., with the value of $x$. More particularly, the Curie temperature and the temperature which gives maximum magnetization of the compound vary inversely with the nitrogen content.

Magnetic stores embodying the invention and including the above-mentioned compounds as an information support material, utilize the above properties to advantage.

Any point of such a store brought into the non-magnetic state by cooling below $\theta_{Tr}$ and then a ferromagnetic state as a result of cooling following adequate heating acquires magnetization if placed in a magnetic field. This local magnetization may provide recording of information which can readily be erased by abrupt re-cooling below $\theta_{Tr}$.

The following table shows the values of the temperatures $\theta_c$ and $\theta_{Tr}$ for values of $x$ equal to 0.7, 0.8 and 0.9 in the compound $Mn_3$ Rh $N_x$.

| x | 0,7 | 0,8 | 0,9 |
|---|---|---|---|
| $\theta_c$ en °C | 190 | 160 | 80 |
| $\theta_{Tr}$ en °C | −30 | −60 | −120 |

To prepare compounds of the formula $Mn_3$ Rh $N_x$, successive sintering operations can be carried out, with grinding operations in between, on mixtures of powdered rhodium, manganese nitride and manganese in calculated proportions.

The manganese nitride used is prepared by nitriding manganese powder at 600°C and normal pressure for 24 hours, and this gives a nitride of a composition in the region of $Mn_{2.7}N$. This nitride is ground and Mn and Rh powders are then added and the mixture is subjected to sintering. The sintering temperature is initially of the order of 500° to 850°C (too low a temperature increases the reaction time and too high a temperature limits the nitrogen content), and then it is progressively raised for the next sintering operations to about 750°C.

A $Mn_3$Rh alloy may alternately be nitrided by means of ammonia, said alloy having been prepared beforehand from corresponding metal powders by sintering at 700°C. The temperature of the resulting nitride is then brought to 750°C for a time long enough to give the required composition by nitrogen loss.

It is noted that it is equally possible to obtain the desired composition by varying the temperature at which nitration is carried out for a given pressure of ammonia, the parameter $x$ decreasing progressively as the temperature increases. It has been found that for a pressure of 1 atmosphere of ammonia one obtains the following table relating the temperature T (in °C) and the parameter $x$ giving the amount of nitrogen:

| T | x |
|---|---|
| 730 | 0,94 |
| 800 | 0,81 |
| 830 | 0,69 |
| 960 | 0,31 |

Some examples of the preparation of compounds of the formula $Mn_3$ Rh $N_x$ will be given below to illustrate the foregoing.

1. Preparation of $Mn_3$ Rh $N_{0.8}$ from manganese nitride 15.9526g of finely ground powdered manganese was heated for 24 hours at 700°C in a stream of nitrogen purified of all traces of oxygen. After cooling, the weight increase was 1.5398g. The resulting nitride had the mean composition $Mn_{2.642}N$. This nitride was finely ground and then annealed in a vacuum-sealed silica ampoule for three days at 650°C to homogenize the composition; this phenomenon is expressed by the following equation:

$$0.8\ (Mn_{2.642}\ N) \qquad Mn_{2.1136}\ N_{0.8}.$$

To obtain the reaction:

$Mn_{2.1136}\ N_{0.8} + Mn_{0.8864} + Rh \qquad Mn_3\ Rh\ N_{0.8}$ 1g of nitride $Mn_{2.642}$ N is mixed with 0.3824g of manganese and 0.8083g of rhodium to give 2.1907g of $Mn_3$ Rh $N_{0.8}$. Homogenization is effected by annealing the prepared mixture at 750°C in a vacuum-sealed silica ampoule. Numerous annealing operations interspersed with grinding operations are necessary.

2. Preparation of $Mn_3$ Rh $N_{0.8}$ from $Mn_3$ Rh

To obtain the reaction 3 Mn + Rh  $Mn_3$ Rh a mixture of 1g of fine powdered manganese and 0.6345g of rhodium is heated to 700°C in a vacuum-sealed silica ampoule and yields 1.6245g of $Mn_3$ Rh after a number of annealing steps interspersed with grinding operations.

To carry out the invention, it is advantageous for the compound $Mn_3$ Rh $N_x$ which constitutes the information support of a store to be available in the form of a uniform and advantageously thin layer. Wafers on which a layer of the product is deposited or films of the magnetic tape type, will therefore be used. In FIG. 3, a layer 6 of the product, i.e., the storage material, is shown deposited on a wafer or substrate 5.

A compound prepared in accordance with one of the above described processes may be used as raw material. This compound is finely ground and suspended uniformly in a resin solution, which is applied to a substrate (magnetic tape or wafer) and which forms the layer constituting the information support once the solvent has been evaporated. Of course the resins used must be capable of withstanding the relatively considerable temperature fluctuations due to writing-in and erasure of the data.

By way of example, the following resins may be used: Araldite (for wafers), Mylar (in both cases) and Kapton.

To prepare the wafers provided with a layer of the compound constituting the data support, the alloy $Mn_3$ Rh may be deposited on the wafer and then be nitrided by means of ammonia or nitrogen, or alternatively the layer can be deposited on said wafer by reactive cathodic atomization of the mixture of manganese and rhodium in the presence of nitrogen (see, for example "Le Vide — Formation et Controle des couches minces" by David and Richardt/Dunod — 1970).

Of course any other deposition process leading to thin layers may be used.

To ensure that the degree of nitridation, i.e., $x$, has a given value, the nitrogen concentration is controlled by appropriate selection of the annealing temperature.

As shown in FIG. 4, the information support may comprise a matrix of plastics material which forms a thin sheet, denoted 7, and fine particles 8 of the storage material uniformly dispersed within the matrix of plastics material.

The compound $Mn_3$ Rh $N_x$ may also be made to occupy a group of discrete locations corresponding to elements 9 of FIG. 5 on a surface which may be formed by one of the above wafers.

To obtain such a group of locations, the deposition can be carried out as described above with the interposition of a masking plate which is perforated at the places corresponding to the said locations.

The material used for the wafers may be any appropriate product, for example mica, silica, glass etc.

To write-in data on stores embodying the invention, which are initially brought to the non-ferromagnetic state, it is possible, as illustrated in FIG. 6, to use a laser beam 10 which produces generally short duration local heating sufficient for the ferromagnetic state to appear at the place in question on cooling.

Data read-out can be effected by any means 11 which detects magnetization directly (read-out head) or indirectly, e.g., by means of Kerr's magnetic-optical effect, wherein it is possible to use the same laser source as that used for write-in (see for example pages 449–456 "L'onde electrique," Volume 49, No. 4, 1969).

The write-in can be erased by erase means 12 providing abrupt cooling.

Any embodiment of the above system will thus give a magnetic store or memory the characteristics of which have been defined above and which have numerous advantages, *inter alia:*

Storage of data is bound up with a change from a non-magnetic state to a ferromagnetic state and not with the direction of magnetization, i.e., it is not influenced by the action of external magnetic fields.

High data density per unit of area is possible because of the absence of any magnetic inter-action, since the initial state is characterized by the absence of magnetization.

The magnetic properties of the compounds used as information supports in stores embodying the invention are such that write-in is maintained even with considerable variations in ambient temperature.

The magnetization intensity can be modulated so that it is possible to obtain at any given point storage which does not have to be in binary form but which can assume any value intermediate 0 and 1.

The last of the above advantages makes it possible to use stores according to the invention for holography.

I claim:

1. For a magnetic store, an information support providing data storage locations made of a storage material capable of storing data in magnetic form, characterized in that said storage material is of the formula $Mn_3 Rh N_x$, in which $x$ has a value from 0.5 to 0.95.

2. An information support as claimed in claim 1, in which $x$ is in the region of 0.8.

3. An information support as claimed in claim 1, including a substrate and a thin layer of the storage material deposited on the substrate.

4. An information support as claimed in claim 3, in which the substrate is formed by a wafer composed of a material selected from the group of materials consisting of mica, glass and silica.

5. An information support as claimed in claim 1, including a matrix of plastics material which forms a thin sheet and fine particles of the storage material uniformly dispersed within the matrix of plastics material.

6. An information support as claimed in claim 5, in which the matrix of plastics material is composed of a material selected from the group of materials consisting of Mylar, Kapton and Araldite.

7. An information support as claimed in claim 5, in which the matrix of plastics material forms a thin flexible sheet.

8. An information support as claimed in claim 7, in which the matrix of plastics material is composed of a material selected from the group of materials consisting of Mylar and Kapton.

9. An information support as claimed in claim 1, including a substrate and a group of discrete storage locations made of the storage material distributed over the substrate.

10. A magnetic store, including:
an information support;
data storage locations on the information support and made of a storage material capable of storing data in magnetic form;
write-in means for recording data in magnetic form on the information support at the data storage locations; and
read-out means for detecting data stored on the information support at the data storage locations and providing a read-out signal significant of the stored data;
the store being characterized in that:
the storage material is of the formula $Mn_3 Rh N_x$, in which $x$ has a value from 0.5 to 0.95; and
the write-in means comprises means for locally heating a storage location from a first temperature to a second temperature and means providing a magnetic field in which the storage location assumes a magnetic state on subsequent cooling from the second temperature.

11. A magnetic store as claimed in claim 10, in which the write-in means includes laser means.

12. A magnetic store as claimed in claim 10, including erase means for erasing information from a storage location, such erase means including means for cooling the storage location below a critical temperature at which the magnetic state of the storage location disappears.

* * * * *